(12) United States Patent
Pickens et al.

(10) Patent No.: US 10,017,134 B2
(45) Date of Patent: Jul. 10, 2018

(54) LOCKING RETAINER SYSTEM FOR AUTOMOTIVE ASSEMBLY

(71) Applicant: Delphi Technologies, Inc., Troy, MI (US)

(72) Inventors: Ryan J. Pickens, Auburn Hills, MI (US); Jesus R. Morales, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 15/159,371

(22) Filed: May 19, 2016

(65) Prior Publication Data

US 2017/0334373 A1 Nov. 23, 2017

(51) Int. Cl.
*B62D 25/02* (2006.01)
*B60R 16/02* (2006.01)
*F16B 5/06* (2006.01)
*B62D 25/00* (2006.01)
*B65D 88/00* (2006.01)

(52) U.S. Cl.
CPC .......... *B60R 16/0215* (2013.01); *B62D 25/02* (2013.01); *F16B 5/06* (2013.01); *B60R 16/0222* (2013.01); *B62D 25/00* (2013.01); *B65D 88/00* (2013.01)

(58) Field of Classification Search
CPC . B60R 16/0215; B60R 16/0222; B62D 25/02; B62D 25/00; B62D 25/005; B65D 88/00; B65D 2313/00; B65D 2303/00
USPC .... 248/300, 223.21, 220.21, 221.11, 225.21, 248/225.11, 229.12, 229.22, 228.2, 230.3, 248/231.41, 316.1, 316.4
See application file for complete search history.

(56) References Cited

U.S. PATENT DOCUMENTS

| | | | | |
|---|---|---|---|---|
| 887,558 | A | * 5/1908 | Werner | A45D 27/29 248/300 |
| 1,432,349 | A | * 10/1922 | McFarland | E04B 1/34384 403/374.1 |
| 4,878,639 | A | * 11/1989 | Tempco | H01R 9/16 248/225.11 |

(Continued)

FOREIGN PATENT DOCUMENTS

GB 2317412 A * 3/1998 ............... B60R 7/08
GB 2317412 A 3/1998

*Primary Examiner* — Nkeisha Smith
(74) *Attorney, Agent, or Firm* — Robert J. Myers (57) ABSTRACT

A locking retainer system configured to secure an automotive component within a motor vehicle includes a panel defining a T-shaped aperture and a retainer. The T-shaped aperture has a vertical aperture portion and a longitudinal aperture portion. The vertical aperture portion is defined by a first planar portion of the panel and the longitudinal aperture portion is defined by a second planar portion of the panel. The first planar portion is laterally offset from the second planar portion. The retainer has a vertical retainer portion and a longitudinal retainer portion and is attached to the automotive component by an elongated strut intermediate the vertical retainer portion and the automotive component. The panel is configured to receive the retainer within the aperture, thereby securing the automotive component to the panel and limiting motion of the automotive component relative to the panel along vertical, longitudinal, and lateral axes.

4 Claims, 6 Drawing Sheets

(56) References Cited

U.S. PATENT DOCUMENTS

| | | | | |
|---|---|---|---|---|
| 5,035,389 A * | 7/1991 | Wang | ............ | A47G 29/08 |
| | | | | 248/224.51 |
| 5,086,958 A * | 2/1992 | Nagy | ............ | B60N 3/002 |
| | | | | 224/277 |
| 5,356,105 A * | 10/1994 | Andrews | ............ | B63B 35/14 |
| | | | | 248/221.11 |
| 6,109,819 A * | 8/2000 | Welch | ............ | A47B 13/003 |
| | | | | 248/222.41 |
| 6,637,707 B1 * | 10/2003 | Gates | ............ | A47B 81/005 |
| | | | | 211/64 |
| 7,172,164 B2 * | 2/2007 | Fuelling | ............ | A01K 97/10 |
| | | | | 248/309.1 |
| 7,261,264 B2 * | 8/2007 | Moran | ............ | A01K 1/0356 |
| | | | | 24/573.11 |
| 8,474,768 B2 * | 7/2013 | Zhadanov | ............ | F16M 13/022 |
| | | | | 248/205.4 |

* cited by examiner

FIG. 9

LOCKING RETAINER SYSTEM FOR AUTOMOTIVE ASSEMBLY

TECHNICAL FIELD OF THE INVENTION

The invention relates to a retainer system for automotive assembly, in particular a locking retainer system having a T shaped slot and corresponding retainer.

BACKGROUND OF THE INVENTION

Automotive components, such as electrical distribution centers are used to provide electrical power to devices throughout a motor vehicle, are typically attached to sheet metal panels making up the vehicle's body structure. These components may be secured to the body structure of the motor vehicle by attachment features such as bolts, nuts, studs, screws, rivets, clips, etc. These attachment features must be chosen not only for their ability to properly secure the component, but also for ease of assembly in order to reduce manufacturing time and improve manufacturing quality. The attachment features may also need to be chosen to facilitate ease of removal in the case of serviceable components.

Treaded fasteners typically offer secure attachment and easy disassembly, but require time and tools to rotate the fasteners as they are tightened and loosened. Rivets and clips typically offer easy assembly but are more difficult to disassemble. In addition, packaging space available for the component may impact the choice of attachment feature selected, since space around the component may be required for the purpose of engaging the attachment features.

Automotive manufacturers have expressed a desire for a retainer system that allows a top down installation of a component into a location with limited packaging space around the component to accommodate tools for installation or removal. The attachment features described above have been found to be unable to satisfactorily meet these needs.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with an embodiment of the invention, a locking retainer system configured to secure an automotive component within a motor vehicle is provided. The locking retainer system includes a panel defining a T-shaped aperture having a vertical aperture portion and a longitudinal aperture portion. The vertical aperture portion is defined by a first planar portion of the panel and the longitudinal aperture portion is defined by a second planar portion of the panel. The first planar portion is laterally offset from the second planar portion. The locking retainer system further includes a retainer having a vertical retainer portion and a longitudinal retainer portion. The retainer is attached to the automotive component by an elongated strut that is located intermediate the vertical retainer portion and the automotive component. The panel is configured to receive the retainer within the aperture. The retainer defines a longitudinal ridge that protrudes from the longitudinal retainer portion and this longitudinal ridge engages an edge of the longitudinal aperture portion when the retainer is assembled to the panel, thereby securing the automotive component to the panel and limiting motion of the automotive component relative to the panel along vertical, longitudinal, and lateral axes.

The elongated strut may be received within the vertical aperture portion when the retainer is assembled to the panel. The vertical retainer portion may be in contact with an inner surface of the first planar portion of the panel when the retainer is assembled to the panel. The automotive component may define a pair of vertical ribs and these vertical ribs are in contact with an outer surface of the first planar portion of the panel when the retainer is assembled to the panel. The panel may be a portion of the motor vehicle's body structure.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Figure 1:
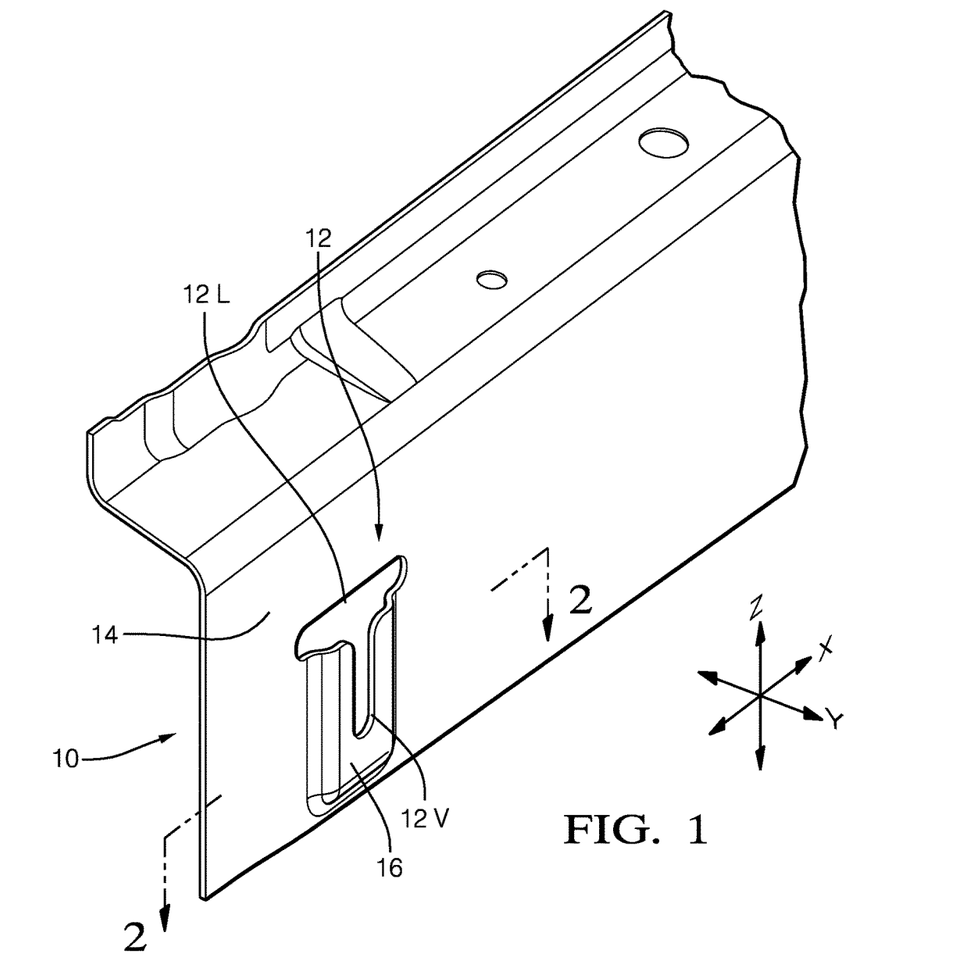
FIG. 1 is a perspective view of a T-shaped aperture of a locking retainer system according to one embodiment.
Figure 2:
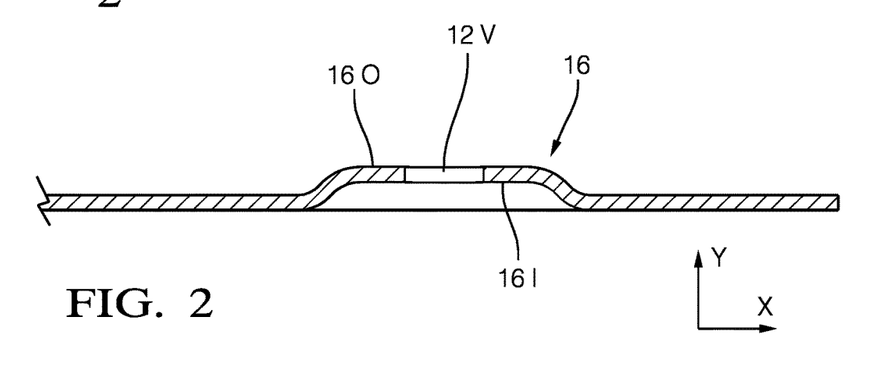
FIG. 2 is a cross sectional view of the T-shaped aperture of FIG. 1 according to one embodiment.

A locking retainer system that is configured to secure an automotive component, such as an electrical distribution center, to a panel of a motor vehicle's body structure is described herein. A non-limiting example of such a locking retainer system is illustrated in FIG. 1. A panel 10 defines a T-shaped aperture 12 that is part of the locking retainer system. This panel 10 is formed of sheet metal. As shown in FIG. 2, the panel 10 is embossed so that it has a first generally planar panel portion 14 and a second generally planar panel portion 16 that is laterally offset from the first panel portion 14. The embossment creating the second panel portion 16 may be formed by a stamping process, preferably by the same stamping process used to form the T-shaped aperture 12. The T-shaped aperture 12 may be formed in the panel 10 by a stamping process, although other processes such as laser or water jet cutting may be used. The T-shaped aperture 12 is cut fully through the panel 10.

Referring again to FIG. 1, the first panel portion 14 defines a longitudinal portion 12L of the T-shaped aperture 12, i.e. the top bar of the T. The second panel portion 16 defines a vertical portion 12V of the T-shaped aperture 12, i.e. the descending leg of the T. The T-shaped aperture 12 is hereinafter referred to as the T-shaped slot 12, the vertical portion 12V hereinafter referred to as the vertical slot 12V, and the longitudinal portion 12L hereinafter referred to as the longitudinal slot 12L. As shown, the ends of the longitudinal slot 12L and the vertical slot 12V are rounded, as is the junction between the longitudinal slot 12L and the vertical slot 12V.

Figure 4:
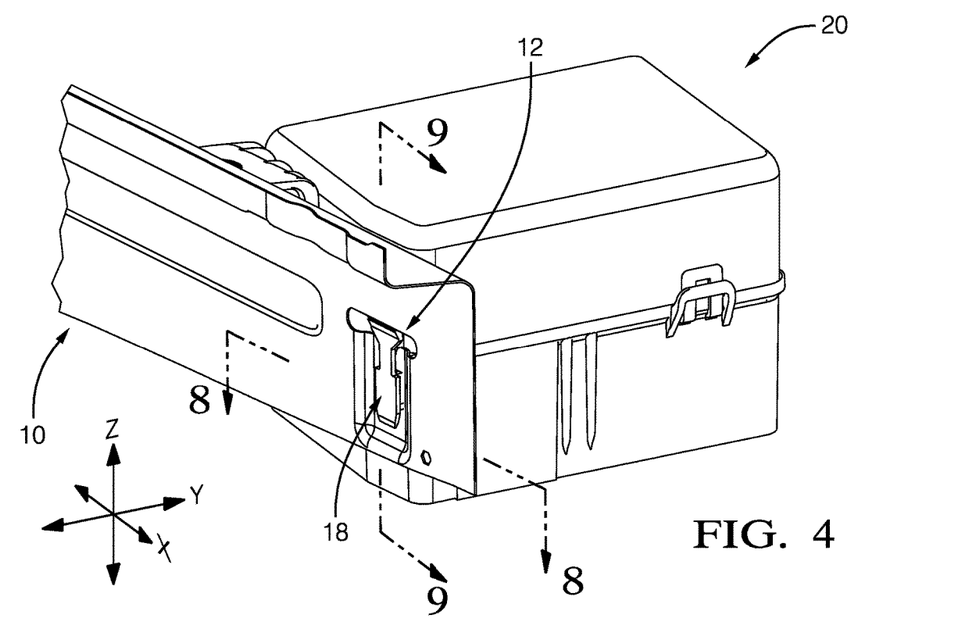
FIG. 4 is a perspective view of the locking retainer system showing the retainer of FIG. 3 inserted into the T-shaped aperture of FIG. 1 according to one embodiment.

The locking retainer system further includes a corresponding retainer 18, illustrated in FIG. 4, that is attached to the automotive component 20. The retainer 18 has a vertical retainer portion 18V and a longitudinal retainer portion 18L and is attached to an outer housing 22 of the automotive component 20 by an elongated strut 24 located intermediate the vertical retainer portion 18V and the automotive component 20. The retainer 18 has a generally planar profile and the longitudinal retainer portion 18L is normally coplanar with the vertical retainer portion 18V. The retainer 18 is formed a resilient plastic material, such as polyamide (NYLON). The retainer 18, strut 24, and outer housing 22 may be integrally formed of the same material. The longitudinal retainer portion 18L defines a longitudinal ridge 26 protruding from a first surface 28 of the longitudinal retainer portion 18L. A first major surface 30 of the longitudinal ridge 26 forms an acute angle relative to the face 32 of the longitudinal retainer portion 18L from which it protrudes while a second major surface 34 of the longitudinal ridge 26 forms substantially a right angle relative to the face 32 of the longitudinal retainer portion 18L from which it protrudes. As used herein, "substantially a right angle" means ±10° of 90°.

Figure 3:
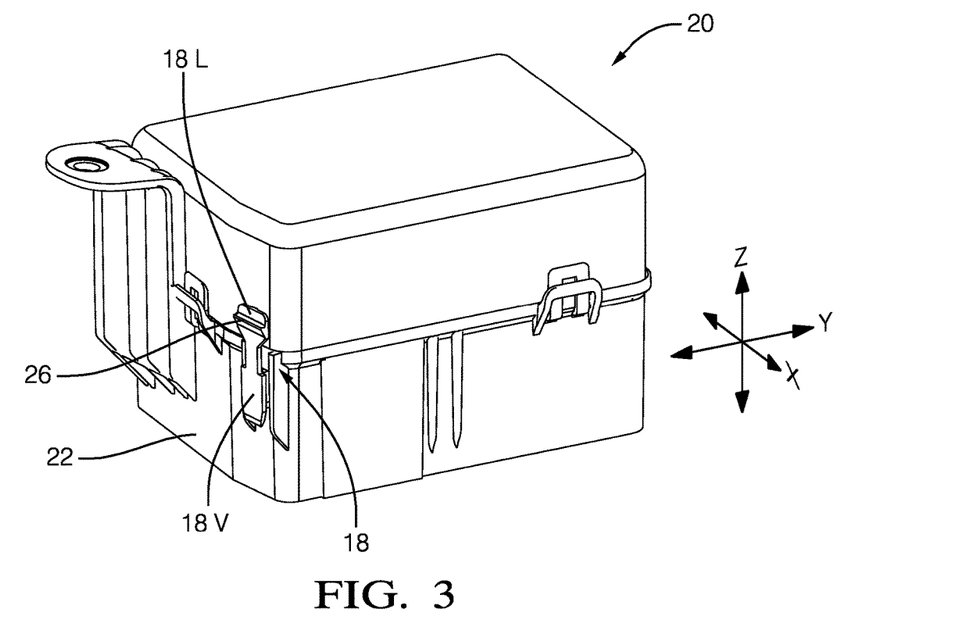
FIG. 3 is a perspective view of an electrical component having a retainer of a locking retainer system according to one embodiment.
Figure 5:
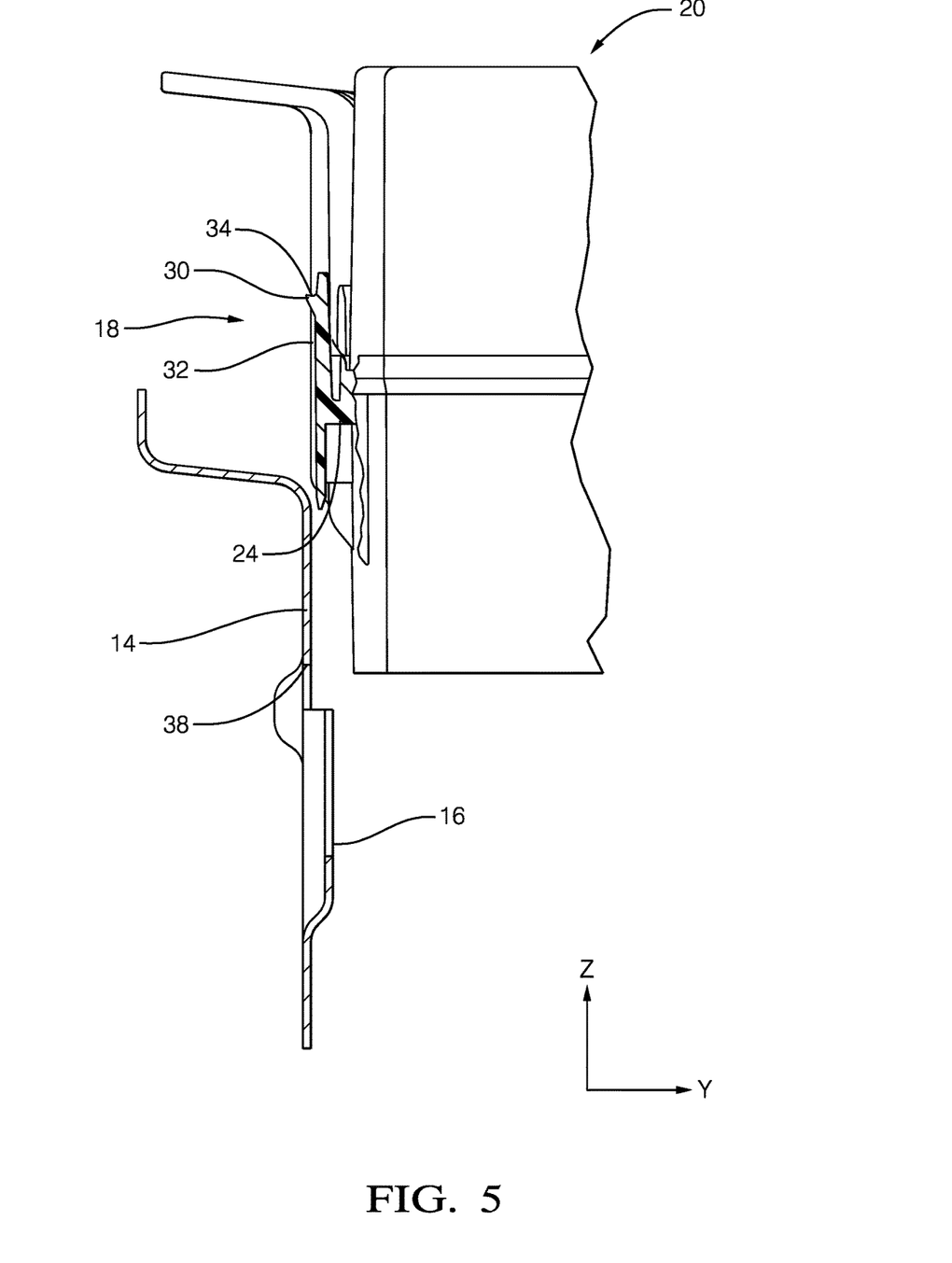
FIG. 5 is a partial cross sectional view of the locking retainer system of FIG. 4 in a preassembled condition according to one embodiment.
Figure 6:
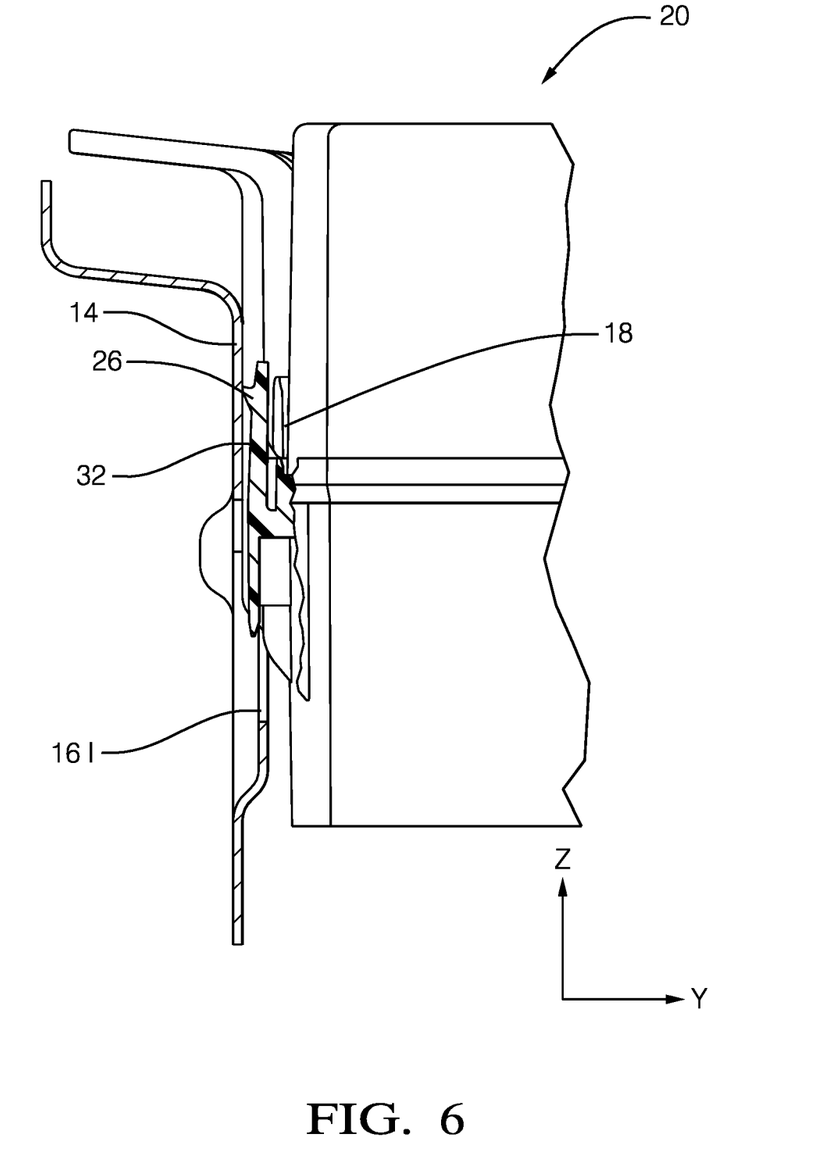
FIG. 6 is a partial cross sectional view of the locking retainer system of FIG. 4 in a partially assembled condition according to one embodiment.
Figure 7:
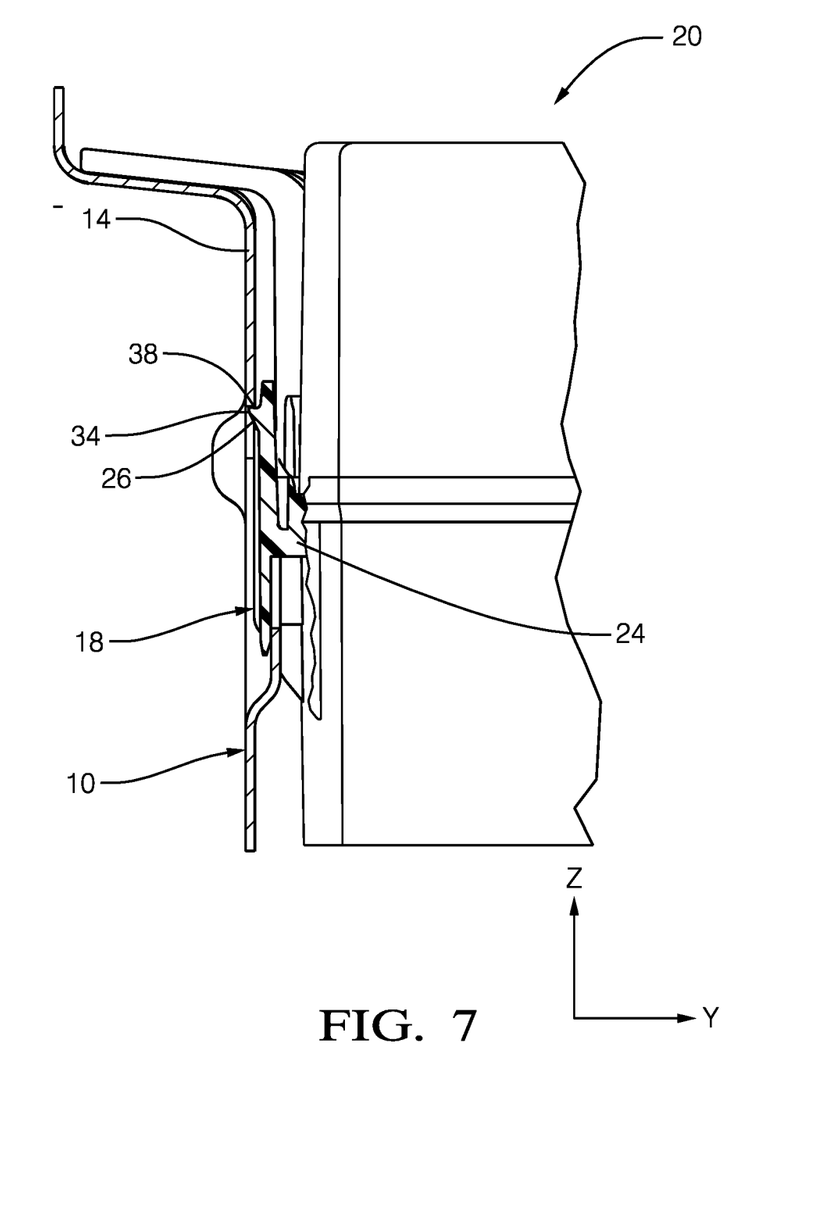
FIG. 7 is a partial cross sectional view of the locking retainer system of FIG. 4 in a fully assembled condition according to one embodiment.

FIGS. 5-7 illustrate a process of securing the automotive component 20 to the panel 10 of the motor vehicle using the T-shaped slot 12 and retainer 18 of the locking retainer system. As shown in FIG. 3, the retainer 18 is aligned with the T-shaped slot 12 so that the vertical retainer portion 18V will slide in between an inner surface 14I of the first panel portion 14 and an outer surface 16O of the second panel portion 16 and so that the strut 24 will be received within the vertical slot 12V.

FIG. 5 shows the locking retainer system in a pre-assembled condition. Prior to engagement the retainer 18 on the automotive component 20 is aligned with the T-shaped slot 12 so that the retainer 18 may be inserted into the T-shaped slot 12 in a vertical direction.

FIG. 6 shows the locking retainer system in a partially assembled condition. As the automotive component 20 is moved in the insertion direction, the retainer 18 is partially received in the T-shaped slot 12, a second surface 36 of the vertical retainer portion 18V contacts the inner surface 16I of the second panel portion 16 and the strut 24 is received within the vertical slot 12V. The second surface 36 of the vertical retainer portion 18V is opposite the first surface 28 of the longitudinal retainer portion 18L. In addition, the first major surface 30 of the longitudinal ridge 26 contacts the first panel portion 14. The resilient material forming the retainer 18 allows the longitudinal retainer portion 18L to deflect the away from the first panel portion 14. In alternative embodiments the retainer 18 may be rigid and the second panel portion 16 may be resiliently deflected by the longitudinal ridge 26.

FIG. 7 illustrates the locking retainer system in a fully assembled condition with the retainer 18 fully received within the T-shaped slot 12. As shown, the strut 24 is received within the vertical slot 12V, the second surface 36 of the vertical retainer portion 18V is in contact with the inner surface 16I of the second panel portion 16. In addition, the first major surface 30 has cleared the inner surface 14I of the first panel portion 14, allowing the longitudinal retainer portion 18L to return so that the longitudinal retainer portion 18L is in contact with the outer surface 14O of the first panel portion 14. The longitudinal ridge 26 is now disposed within the longitudinal slot 12L and the second major surface 34 of the longitudinal ridge 26 is now engaging an edge 38 of the longitudinal slot 12L.

The longitudinal ridge 26 may be undercut, i.e., the second major surface 34 may also form an acute angle of 80 to 89 degrees relative to the face 32 of the longitudinal retainer portion 18L from which it protrudes. This undercut increases the difficulty of releasing the longitudinal ridge 26 from engagement with the edge 38 of the longitudinal slot 12L inhibiting inadvertent release of the locking retainer system.

Figure 8:
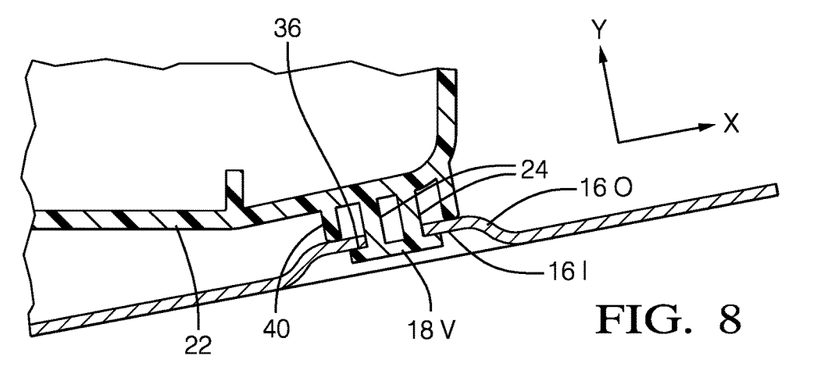
FIG. 8 is a full cross sectional view of the locking retainer system of FIG. 4 in the fully assembled condition of FIG. 7 according to one embodiment.

As illustrated in FIG. 8, the automotive component 20 also defines a pair of vertical ribs 40 protruding from the outer housing 22. There is one rib 40 located on each side of the strut 24. The vertical ribs 40 are generally parallel with the strut 24. The vertical ribs 40 may be formed integrally with the outer housing 22 and may be formed of the same material as the outer housing 22.

Without subscribing to any particular theory of operation, the engagement of the longitudinal ridge 26 with the edge 38 of the longitudinal slot 12L inhibits vertical movement of the automotive component 20 relative to the panel 10. Lateral movement of the automotive component 20 relative to the panel 10 is inhibited by the contact of the first surface 28 of the longitudinal retainer portion 18L with the inner surface 14I of the first panel portion 14 and the contact of the vertical ribs 40 with the outer surface 14O of the first panel portion 14. The engagement of the strut 24 with the vertical slot 12V inhibits longitudinal movement of the automotive component 20 relative to the panel 10. Therefore, the automotive component 20 is secured to the panel 10 by the T-shaped slot 12 and the retainer 18 of the locking retainer system and the locking retainer system limits motion of the automotive component 20 relative to the panel 10 along vertical, longitudinal, and lateral axes.

Figure 9:
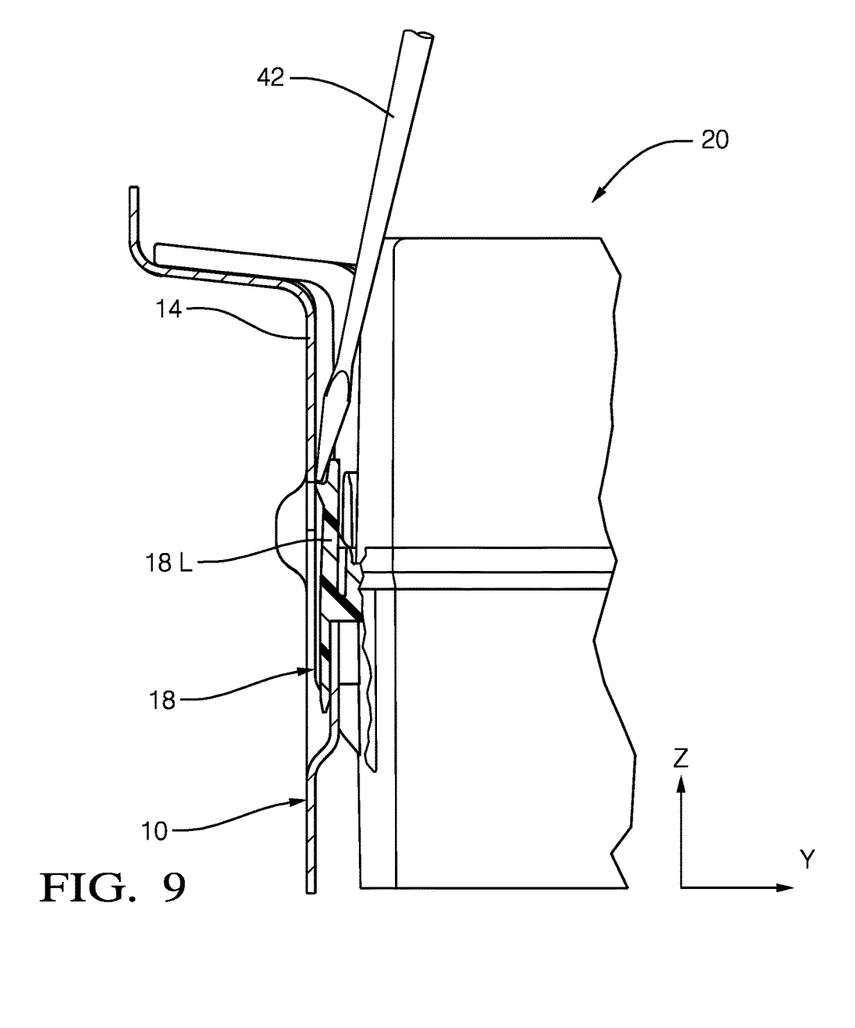
FIG. 9 is a partial cross sectional view of the locking retainer system of FIG. 4 showing release of the retainer from the T-shaped aperture for disassembly according to one embodiment.

As shown in FIG. 9, the retainer 18 may be released from the T-shaped slot 12 by using a simple tool, such as a flat bladed screw driver 42, to pry the longitudinal retainer portion 18L away from the first panel portion 14 so that the longitudinal ridge 26 no longer engages the edge 38 of the longitudinal slot 12L and the retainer 18 may be removed from the T-shaped slot 12.

Accordingly, a locking retainer system is provided. The system provides the benefit of attaching an automotive component to an automotive panel, such as a under hood bulkhead without the need of tools. The locking retainer system secures the automotive to the component in three axes. The locking retainer system can be arranged to that the component may be installed by an assembly operator in a top down fashion. The locking retainer assembly provides secure attachment until released for service or replacement by simple tools, such as a flat blade screwdriver.

While this invention has been described in terms of the preferred embodiments thereof, it is not intended to be so limited, but rather only to the extent set forth in the claims that follow. Moreover, the use of the terms first, second, etc.

does not denote any order of importance, but rather the terms first, second, etc. are used to distinguish one element from another. Furthermore, the use of the terms a, an, etc. do not denote a limitation of quantity, but rather denote the presence of at least one of the referenced items. As used herein, the terms vertical, lateral, and longitudinal do not denote any particular direction or orientation but rather refer to orientation or alignment with one of three mutually orthogonal axes, e.g. a lateral axis X, a longitudinal axis Y, and a vertical axis Z. Likewise, inner and outer do not denote any particular direction or orientation but rather refer to opposing orientations.

We claim:

1. A locking retainer system, comprising:
a panel defining a T-shaped aperture having a vertical aperture portion and a longitudinal aperture portion, wherein the vertical aperture portion is defined by a first planar portion of the panel and the longitudinal aperture portion is defined by a second planar portion of the panel, and wherein the first planar portion is laterally offset from the second planar portion; and
a retainer having a vertical retainer portion and a longitudinal retainer portion and attached to an automotive component by an elongated strut intermediate the vertical retainer portion and the automotive component, wherein the retainer defines a longitudinal ridge protruding from the longitudinal retainer portion, wherein the panel is configured to receive the retainer within the aperture, wherein the longitudinal ridge engages an edge of the longitudinal aperture portion when the retainer is received within the aperture, thereby securing the automotive component to the panel and limiting motion of the automotive component relative to the panel along vertical, longitudinal, and lateral axes, wherein the automotive component defines a vertical rib on each side of the strut, and wherein each vertical rib is in contact with an outer surface of the first planar portion of the panel when the retainer is assembled to the panel.

2. The locking retainer system according to claim 1, wherein the elongated strut is received within the vertical aperture portion when the retainer is assembled to the panel.

3. The locking retainer system according to claim 1, wherein the vertical retainer portion is in contact with an inner surface of the first planar portion of the panel when the retainer is assembled to the panel.

4. The locking retainer system according to claim 1, wherein the panel is a portion of a body structure of a motor vehicle.

* * * * *